United States Patent [19]
Merensky

[11] Patent Number: 5,553,813
[45] Date of Patent: Sep. 10, 1996

[54] AIRPLANE PASSENGER SEAT ROW

[75] Inventor: Harald Merensky, Hamburg, Germany

[73] Assignee: Keiper Recaro GmbH & Co., Remscheid, Germany

[21] Appl. No.: 335,399

[22] Filed: Nov. 3, 1994

[30] Foreign Application Priority Data

Nov. 6, 1993 [DE] Germany ............... 43 37 941.9

[51] Int. Cl.⁶ ............... B60N 02/28; B64D 11/06
[52] U.S. Cl. ............... 244/118.6; 244/122 R; 297/232; 297/257; 297/118
[58] Field of Search ............... 244/118.6, 122 R; 297/232, 297, 299, 257, 118, 130

[56] References Cited

U.S. PATENT DOCUMENTS

| 5,131,607 | 7/1992 | Arnold et al. ............ 244/118.6 |
| 5,178,345 | 1/1993 | Peltola et al. ............ 244/118.6 |
| 5,180,120 | 1/1993 | Simpson et al. ............ 244/118.6 |
| 5,193,765 | 3/1993 | Simpson et al. ............ 244/118.6 |
| 5,456,518 | 10/1995 | Kemppainen et al. ............ 297/232 |

FOREIGN PATENT DOCUMENTS

| 0322930 | 7/1989 | European Pat. Off. . |
| 0530900A1 | 3/1993 | European Pat. Off. . |
| 0036030 | 2/1986 | Japan ............ 297/232 |
| 2127367 | 4/1984 | United Kingdom ............ 297/232 |

*Primary Examiner*—Andres Kashnikow
*Assistant Examiner*—Virna Lissi Mojica
*Attorney, Agent, or Firm*—Wigman, Cohen, Leitner & Myers, P.C.

[57] ABSTRACT

An airplane passenger seat row is disclosed which comprises a seat frame, which is common to all seats and which includes cross members and feet that are fixed to said cross members. Seat cushion carriers and backrests can be adjusted in their position of inclination. A section of the seat cushion carriers and a section of the backrests are designed as components which can be moved in at least two positions in the longitudinal direction of the cross members. A backrest of a center seat includes a center section located between two side sections. Each side section is assigned a locking mechanism, by means of which in the one position of the moveable components both side sections can be connected shape-lockingly to the center section, in order to form sections of the center seat, and in the second position the side sections can be connected shape-lockingly to the seats backrest which adjoin laterally the center seat, in order to form sections of both side seats.

10 Claims, 4 Drawing Sheets

AIRPLANE PASSENGER SEAT ROW

BACKGROUND OF THE INVENTION

The invention relates to an airplane passenger seat row.

In conventional airplane seat rows, when it is desired to convert seats with a different width or different spacing the entire seat row usually has to be replaced. Thus, for example, when the number of seats in the business class of the airplane is increased, the number of seats in the economy class is reduced. Of course, it is not difficult to exchange a seat row, because only the feet of the frame of the seat row has to be released from the rails in the cabin floor. Nevertheless, a lot of time is consumed owing to transport of the seat rows. The necessary storage of such seats is also expensive.

A known airplane seat row of the aforementioned kind (EP 0 530 900 A1) enables a significantly taster retrofitting of the airplane cabin. Owing to the design of both seat cushion carriers and sections of the seat backrests as components that can be slid relative to each other in the direction of the cross members of the seat rows, the seat rows no longer have to be replaced by other seat rows during a retrofit. Rather the retrofitting can be done by changing the seat rows themselves. Thus, only the moveable components are slid and the backrest of a center seat, which is situated between two laterally adjoining seats, is modified in such a manner that in a position, in which there are a reduced number of seats with increased seat width, the side sections of this backrest are added to the backrests of the laterally adjoining seats and that in the other position, in which there are a larger number of seats of normal width, these side sections form together with the center section the backrest of the center seat. The side sections of the center backrest can be connected to the backrest of the laterally adjoining seat or the center section of the backrest of the center seat in this prior art airplane passenger seat row by means of a bolt, which can be slid longitudinally in the displacement direction of the components, for which reason the connection is only shape-locking in the swivel direction of the backrest.

OBJECTS AND SUMMARY OF THE INVENTION

A principal object of the present invention is to provide an airplane passenger seat row, where a shape-locking connection in all directions can be realized in a simple manner between the side sections of the backrest of the center seat and those parts with which the side sections of the backrest of the center seat are to be connected. Other objects and advantages of the present invention will be apparent from the description which follows.

Since the locking elements are designed as gripping arms, which can perform with the aid of the respective gearing arrangement a combined sliding and swivel motion, a connection can be produced in a simple manner that is not only shape-locking in the swivel direction of the backrest but also in the sliding direction of the components and, moreover, can clamp together the connected parts, thus eliminating the play that usually exists.

Preferably, both gripper arms can be moved by means of the gearing arrangement in a manner between their release and locking positions such that, when the one locking element is moved into the release position, the other locking element is moved into the locking position and vice versa. A single actuating operation is sufficient to combine both side sections either with the center section together to the backrest of the center seat thereby simultaneously releasing the connection with the backrests of the laterally adjoining seats, or, to release both side sections from the center section, in order to attach simultaneously to the backrests of the laterally adjoining seats, and thereby to widen them.

Preferably, a joint actuation of all locking elements of a seat row by means of a joint adjusting device is provided. Thus, the seat row can be rebuilt in a very short period in a simple manner.

BRIEF DESCRIPTION OF THE DRAWINGS

The present invention will now be explained with reference to the embodiment illustrated in the drawings, wherein.

DETAILED DESCRIPTION OF THE PREFERRED EMBODIMENT

Figure 1:
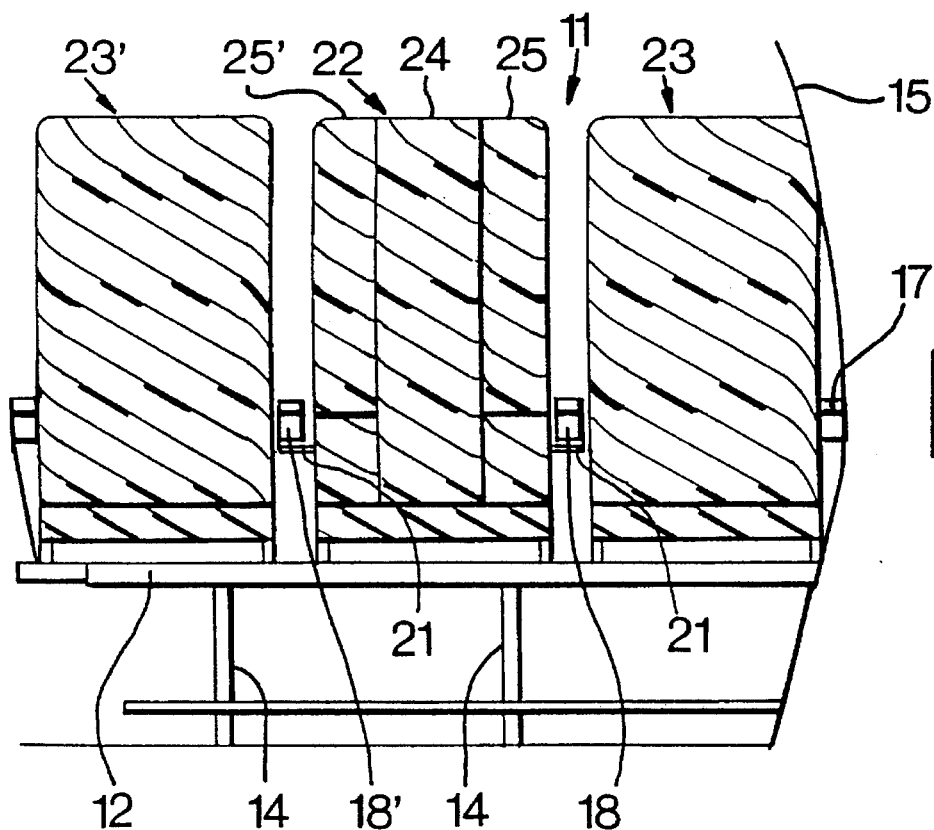
FIG. 1 is a schematically simplified front view of one embodiment of a seat row adjusted for three seats.

Referring now to the drawing wherein like numerals indicate like elements throughout the several views, one embodiment of the entire seat row construction according to the invention is denoted as 1, and which can be converted from three to two seats and vice versa As shown in FIG. 1, seat row 11, adjusted for three seats, has a space between two neighboring seats, in which there are located, displaceable arm rests 18, 18'.

Figure 3:
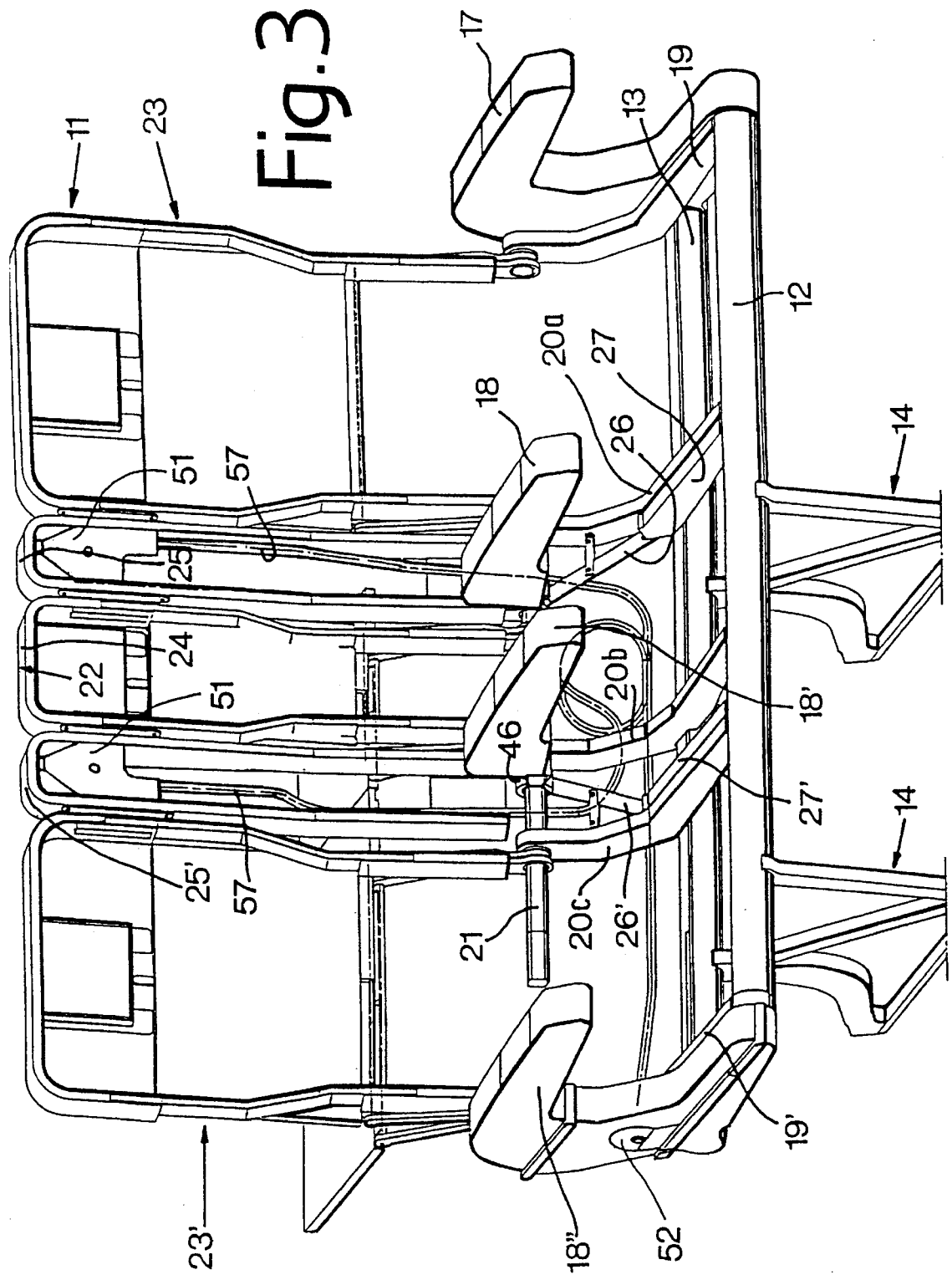
FIG. 3 is a perspective view of the embodiment according to FIGS. 1 and 2, without cushions, showing an adjustment for two seats.

Referring to FIG. 3, seat row 11 includes a seat frame, having a front cross member 12 and a rear cross member 13. Feet 14 carry the cross members 12, 13 and are rigidly connected. The seat that borders the side wall 15 of the cabin is fixed in the longitudinal direction of cross members 12, 13. Seat divider 19, adjoining the side wall 15 of the cabin, and the arm rest 17 which is connected to said seat divider bridge cross members 12, 13. Arm rests 18, 18' and 18" can be moved relative to the arm rest 17 by a predetermined distance in the longitudinal direction of the cross members 12, 13. Therefore, the arm rest 18" provided at the aisle-sided end of the seat row is rigidly attached to the seat divider 19' which is provided at this end of the seat row 11. The other seat dividers 20a, 20b and 20c are movably connected to the cross members 12,13 by a predetermined distance in the longitudinal direction of the cross members 12,13. Seat dividers 20a, 20b, 20c include an opening on their upper rear end portion which engage rod member or tube 21, to which the center backrest 22 and the inner member of the wall-sided backrest 23 and the aisle-sided backrest 23' are connected so as to be adjustable in the inclined position. The outer longitudinal members of the backrests 23, 23' are hinged to the seat divider 19 or seat divider 19'.

As depicted in FIG. 3, the center backrest 22 is subdivided into a center section 24 and two symmetrical side sections 25 and 25'. This also applies to the cushion of the center backrest 22, as depicted in FIG. 1. The center section 24 and the two side sections 25, 25' are components that can be moved by predetermined distances in the longitudinal direction of the cross member 12, 13. The side sections 25, 25' can be releasably connected to the center section 24 or the adjacent backrest 23 or 23', by means of a locking mechanism 51. Locking mechanism 51 is located in each side section 25, 25' in its upper end region and are identical and installed in a symmetrical arrangement. Locking mechanism 51 is described below in greater detail with reference to FIGS. 4 and 5.

The two inner arm rests 18, 18' cannot be rotated, but can be slid in the longitudinal direction of the cross members 12, 13 by a sleeve 46 mounted on the rod or tube 21. Arm rests 18, 18' are connected to one longitudinal member 27 or 27' each via a double armed rocking lever 26 or 26'. As with the inner seat dividers 20, longitudinal members 27, 27' are slidably connected to the cross members 12, 13. The displacement of the inner seat dividers 20a, 20b and 20c results in an opposing displacement of the two inner arm rests 18, 18'.

Figure 2:
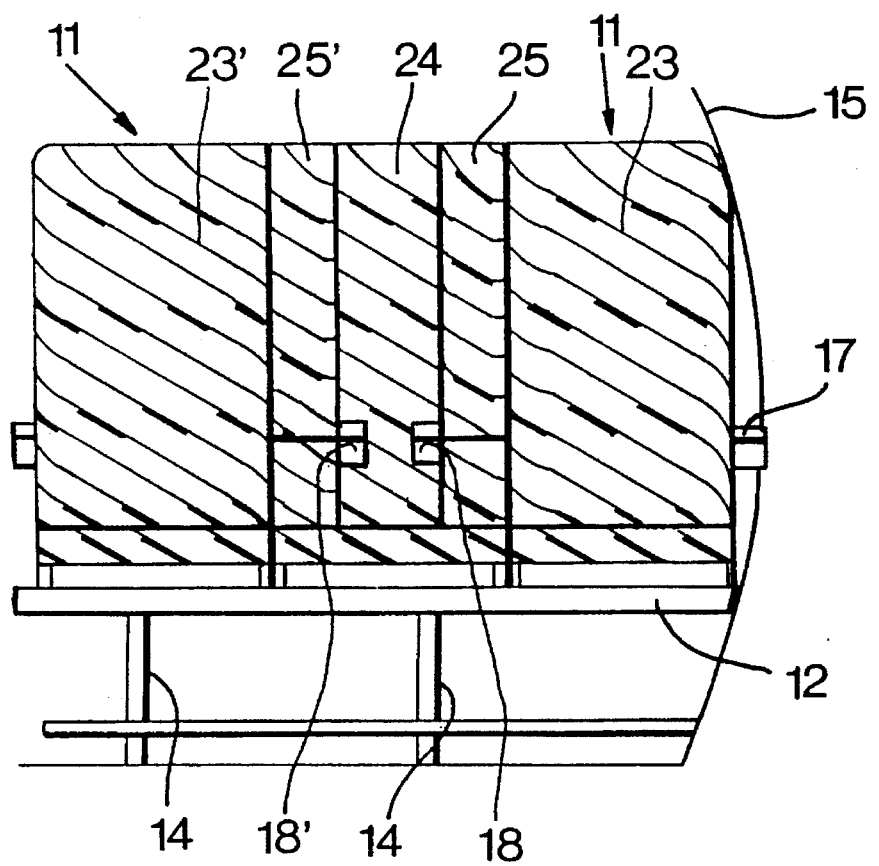
FIG. 2 is a schematically simplified front view of the embodiment shown in FIG. 1 adjusted for two seats having a larger width and greater distance between seats.

If, instead of the three seats illustrated in FIG. 1, only two seat with larger width are required, all of the moveable components are moved in the direction of the rigid seat until the side section 25 rests against the backrest 23 and the backrest 23' rests directly against the side section 25'. As a result of this displacement, inner arm rests 18, 18' come together such that there is still a space between them as shown in FIG. 2, that is at most equal to the width of the center section 24. By actuating the locking mechanism 51, the connection between the two side sections 25, 25' and the center section 24 of the center backrest 22 is released, and the connection of the side segments 25, 25' to the backrests 23 or 23' is made. The components are moved, and the connection between the side segments 25, 25' and the center section 24 is released, and the side segments 25, 25' are connected to the backrests 23 or 23' by means of a single adjusting device 52 (FIG. 3). In this manner, the conversion is carried out in a few seconds.

Since the side sections 25, 25' are no longer connected to the center section 24 when the seat row is adjusted to two wide seats, the backrests of the two wide seats can be adjusted independently of each other. In the preferred embodiment, the seat section is not provided with adjustability. For this reason it is not necessary to divide the seat portion of the center seat. If necessary, however, the seat portion of the center seat could also be divided into three sections as in the case of the center backrest 22.

Figure 4:
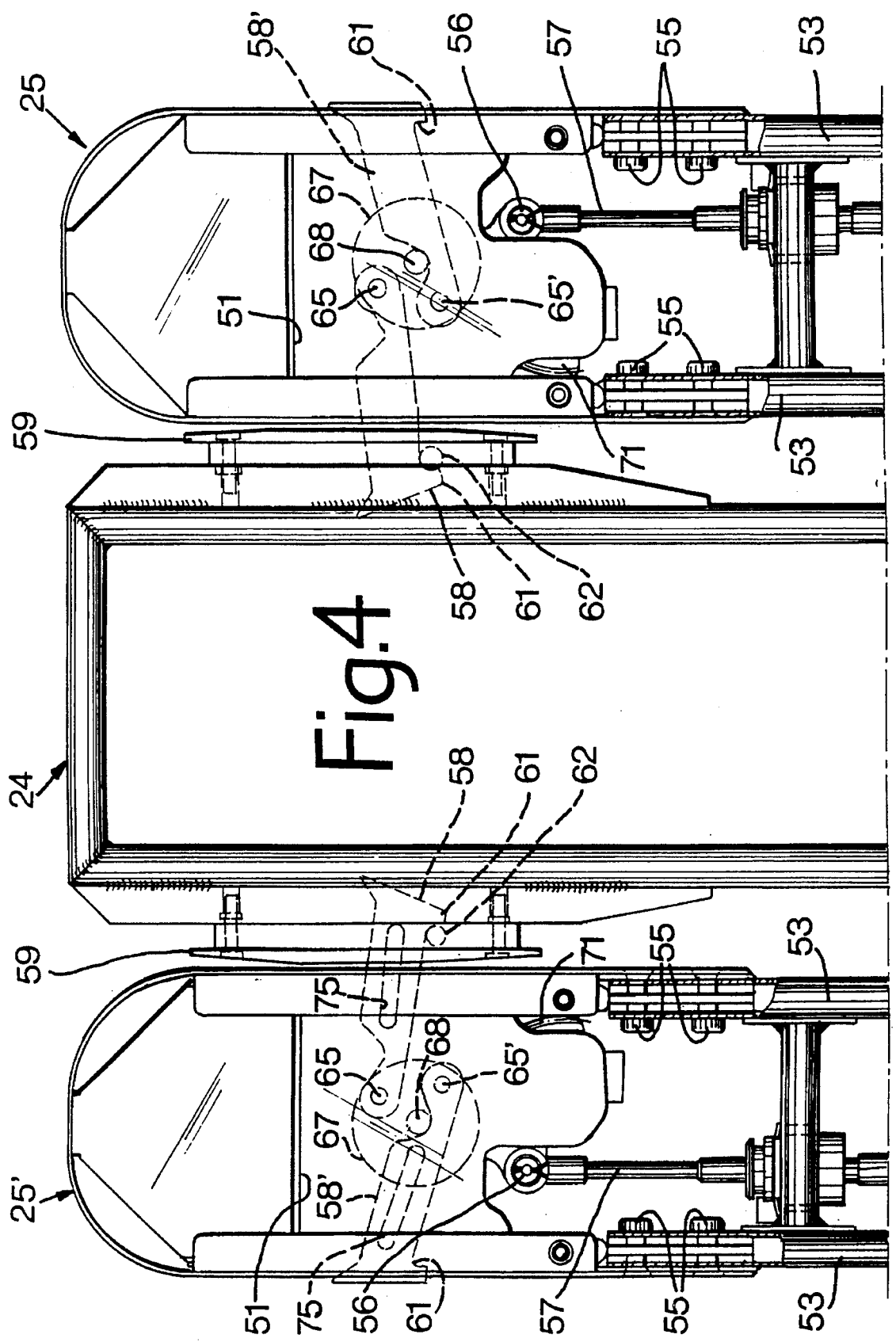
FIG. 4 is a front, partially fragmented, view of only the upper end regions of the center section and the side sections of the backrest of the center seat of the embodiment, without cushions.

The arrangement and construction of the locking mechanism 51 will now be described in detail with reference especially to FIGS. 4 and 5. Referring to FIG. 4, the locking mechanism 51 forms the upper end region of the cushion carriers of the side sections 25, 25', to whose longitudinal members 53 their upper ends are connected via a screw connection 55. FIG. 4 depicts the locking mechanism 51 in the position, in which each related actuating member 57 provides flexible push and pull rod arrangements, which can be moved jointly by means of the adjusting device 52 (FIG. 3) in both directions. Member 57 have ends 56, which are hinged to the respective locking mechanism 51 to the position pushed the farthest to the top. In this position, the gripper arm 58, which is indicated with the dashed line in FIG. 4 and which faces the center section 24, is extended into its locking position, and is moved into a lock box 59, which forms a receptacle and which is screwed together with the cushion carrier of the center section 24.

Figure 5:
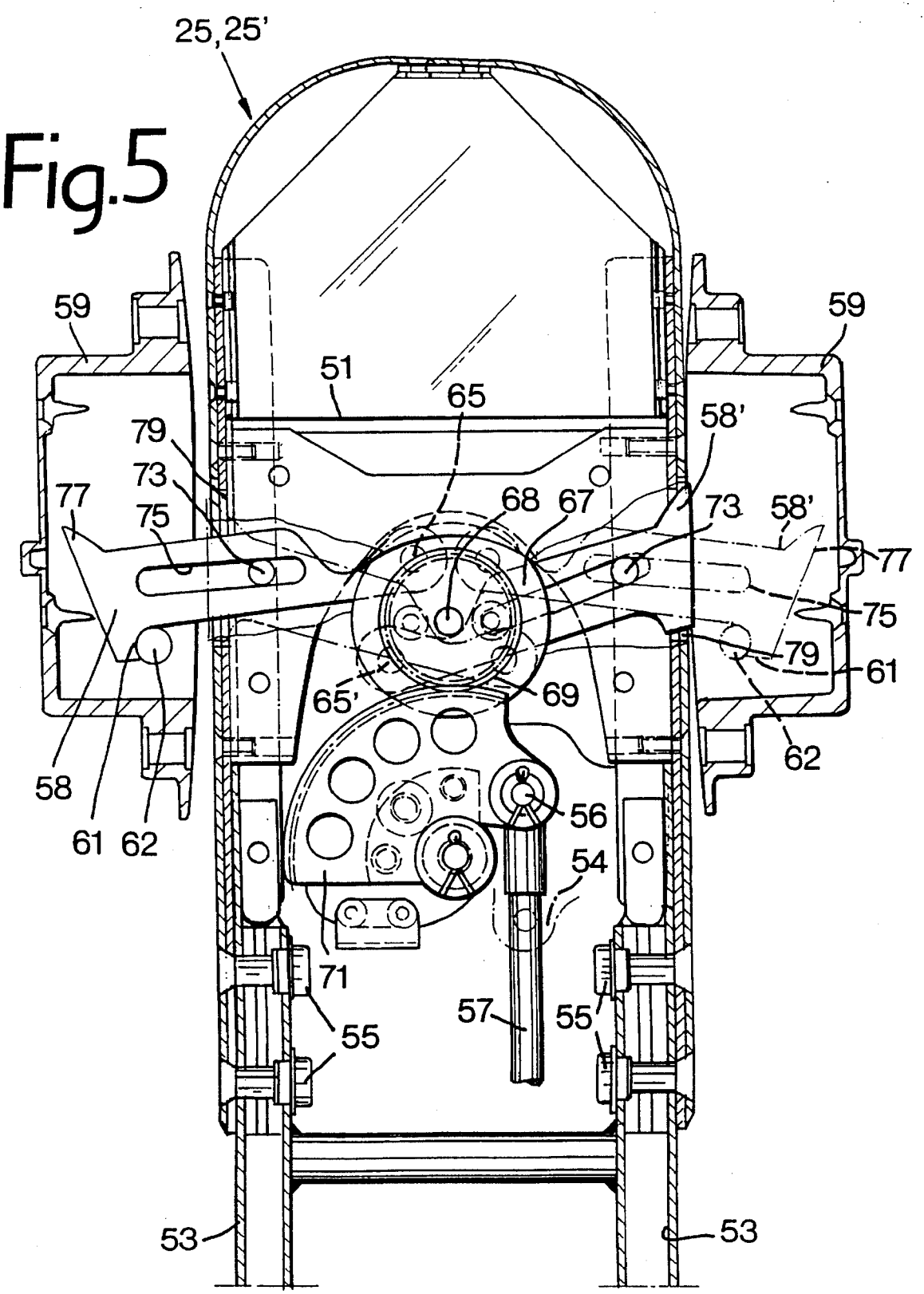
FIG. 5 is an elevational, fragmented view of one of the locking mechanisms used in connection with the present invention.

As seen in FIG. 5, the gripper arm 58, when moved into the opening of the lock box 59, is secured shape-lockingly against relative swivel motions in the rest's direction of inclination by means of the walls of the lock box 59. Also, the gripper arm 58 includes in its outer end region an attached locking hook 61 which engages pin 62 in the lock box 59, to prevent relative movements in the direction of the cross member.

The gripper arm 58' is opposite the gripper arm 58 that is extended into the locking position. In its release position, gripper arm 58' is moved into the housing of the locking mechanism 51 such that its outer end region closes with a flat end surface essentially flush with the housing wall the passage opening 79 (FIG. 5) in said housing wall, for the gripper arms 58, 58'. In this position, which corresponds to the state of the seat row shown in FIG. 1, the side sections 25, 25' together form the backrest 22 of the center seat with the center section. Thus, no connection is provided between the backrests 23, 23' and the side sections 25 or 25', since the gripper arms 58' of the locking mechanisms are in the telescoped release position. On the other hand, a displacement movement, which is produced by the adjusting device 52 and belongs to the actuating members 57, from the position, which is shown in FIG. 4 and which protrudes toward the top, to the bottom into the position indicated at 54 with the dash-dotted line in FIG. 5 causes an actuation of the locking mechanisms 51 in such a manner that the gripper arms 58, which are in their extended locking position in FIG. 4, are now moved out into the locking mechanisms 51 into the release position; and the opposing gripper arms 58', which face the backrests 23 and 23', are moved into the locking position, in order to engage with the related lock boxes (not shown), but which are designed identically like the lock boxes 59 of the center section 24 and are attached to the backrests 23,23'. Thus, in this position the connections between center section 24 and the side sections 25, 25' are released and, instead, the shape-locking connections between side section 25 and backrest 23 and between side section 25' and backrest 23' are produced, so that the backrests 23, 23' have been widened by the side sections 25 or 25', in accordance with the operating state of the seat row of FIG. 2.

As shown in FIG. 5, gripper arms 58, 58' are longitudinally stretched rocking levers, whose inner end regions are hinged on crankpins 65, 65' to a center-disk wheel 67, which can be rotated around a crankshaft 68. A pinion 69, attached to the center-disk wheel 67, engages with a tooth segment 71, which can be pivoted by means of the actuating member 57, which is hinged to said tooth segment. Owing to this gearing connection, when the end 56 of the actuating member 57 is slid between the upwardly protruding position, depicted in FIG. 5, and the position indicated at 56 with the dash-dotted line in FIG. 5, the center-disk wheel 67 is rotated in such a manner that the crankpins 65 and 65' assume the position indicated in FIG. 5. In so doing, either the gripper arm 58 is moved into the locking position, as shown in FIG. 5 with the solid line; and the gripper arm 58' is simultaneously retracted into the unlocking position; or, as shown with the dash-dotted line in FIG. 5, the gripper arm 58 in retracted and, therefore, the gripper arm 58 is moved out into the locking position.

These movements of the gripper arms 58, 58' are combined sliding and swivel movements, whereby the path of motion is determined by a pin/slot guide, which is formed by a pin 73 that is attached stationarily in the housing and which engages with an oblong-like slotted opening 75, which extends essentially in the longitudinal direction in the gripper arms 58, 58'. When moving out into the locking position, the gripper arms' 58, 58' path of movement, caused by the pin/slot guide when the crankshafts 65, 65' are moving, brings the locking hook 61 over the locking pin 62 in the lock box 59 and then lowers the locking hook 61 for the purpose of engaging pin 62. When retracting, the reverse occurs; the hook 61 is pivoted to the top and disengages with the pin 62 and then the gripper arms 58, 58' move back into the housing of the locking mechanism 51. As evident from FIG. 5, the gripper arms 58, 58' are designed identically, but arranged in the reverse orientation. The outer end regions of the gripper arms 58, 58' include an attachment 77, which is opposite the hook 61 and which forms a closure, and which in the retracted release position covers virtually the entire area of the passage opening gripper arms 58, 58', as apparent in FIG. 5 on the right side at the gripper arm 58'. Preferably, the gripper arms 58, 58' are made of steel plate approximately 8 mm thick. The largest width corresponding to the height of the housing opening 79 is 33 mm from the end of the attachment 77 to the edge of the locking hook 61.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed:

1. An airplane passenger seat row, having a plurality of seats such as a center seat and laterally adjoining seats, comprising:

a seat frame; at least one cross member fixed to said seat frame, feet supporting said cross members; cushion carriers for carrying seat cushions; seat dividers carried by said cross members; adjustable backrests; one of said seat cushion carriers and at least one of said backrests are moveable in at least two positions by predetermined distances in the longitudinal direction of said cross member; the backrest of said center seat includes a center section situated between two side sections;

each side section has a locking mechanism, said locking mechanism includes moveable components for engaging said side sections shape-lockingly to the center section to form sections of the center seat, and to engage the side sections shape-lockingly to said seat backrest to form section of said laterally adjoining seats; each locking mechanism having a moveable gripper arm to interact with the center section or the backrest of the laterally adjoining seat and a gearing arrangement intended for a combined sliding and swivelling movement of said gripper arm.

2. The airplane passenger seat row of claim 1, wherein said locking mechanism includes a pair of moveable gripper arms, said gripper arms being coupled to the gearing arrangement for a common movement between their release and locking positions such that the movement of one of the gripper arm into the release position corresponds to the movement of the other gripper arm into the locking position, and vice versa.

3. The airplane passenger seat row of claim 2, wherein said gripper arms are guided in such a manner at the cushion carrier of the related side section that they extend in the locking position with one outer end region from a side wall of the cushion carrier into a receptacle of the center section or the backrest of the laterally adjoining seat and are moved into the side section in the release position.

4. The airplane passenger seat row of claim 3, wherein said gripper arms are of substantially identical construction.

5. The airplane passenger seat row of claim 4, wherein said gripper arms are guided for combined sliding and swivelling movement, a pin/slot guide provided at the cushion carrier or the side section cooperates to guide said gripper arms.

6. The airplane passenger seat row of claim 5, wherein the outer end region of said gripper arm forms a gripper hook, which engages said pin by the combined sliding and swivel movement into a locking position thereby preventing relative movements in the direction of the cross member; and wherein walls of said receptacle that border on the opening form with the outer end region of the gripper arms, a shape-locking safety against relative movements in the direction of a rest inclination.

7. The airplane passenger seat row of claim 6 wherein each gripper arm is positioned at its inner end region, which is assigned to the gearing arrangement, on a related crankpin of a common crankshaft of the gearing arrangement.

8. The airplane passenger seat row of claim 7, wherein said gearing arrangement includes a gear drive to convert a translatory driving motion of an actuating member into a rotational movement of the crankshaft.

9. The airplane passenger seat row of claim 8, wherein said locking mechanism can be jointly actuated by means of an adjusting device, which produces the driving movement of the actuating member of both gearing arrangements.

10. The airplane passenger seat row of claim 9 in any one of the each locking mechanism forms with parts of its housing the cushion carrier of the upper end region of the related side section.

* * * * *